United States Patent
Mitchell et al.

(10) Patent No.: US 9,702,971 B2
(45) Date of Patent: Jul. 11, 2017

(54) HIGH-AVAILABILITY ISAR IMAGE FORMATION

(71) Applicant: RAYTHEON COMPANY, Waltham, MA (US)

(72) Inventors: Benjamin Mitchell, Tucson, AZ (US); Andrew J. Patterson, Tucson, AZ (US); Raymond Samaniego, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 582 days.

(21) Appl. No.: 14/215,737

(22) Filed: Mar. 17, 2014

(65) Prior Publication Data

US 2015/0260839 A1 Sep. 17, 2015

(51) Int. Cl.
*G01S 13/90* (2006.01)
*G01S 7/288* (2006.01)

(52) U.S. Cl.
CPC .......... *G01S 13/9035* (2013.01); *G01S 7/288* (2013.01); *G01S 2007/2883* (2013.01); *G01S 2013/9064* (2013.01)

(58) Field of Classification Search
CPC .............................. G01S 13/9035; G01S 7/288
USPC ....................................... 342/25 R–25 F, 196
See application file for complete search history.

(56) References Cited

U.S. PATENT DOCUMENTS

| | | | |
|---|---|---|---|
| 6,255,981 B1* | 7/2001 | Samaniego | G01S 13/9035 342/195 |
| 2008/0074313 A1* | 3/2008 | Willey | G01S 13/87 342/25 R |
| 2010/0259442 A1* | 10/2010 | Abatzoglou | G01S 13/282 342/25 A |
| 2011/0163912 A1* | 7/2011 | Ranney | G01S 13/90 342/25 F |
| 2015/0061926 A1* | 3/2015 | Ranney | G01S 13/9029 342/25 B |

OTHER PUBLICATIONS

C. Ma, T. S. Yeo, H. S. Tan, J. Wang and B. Chen, "Three-Dimensional ISAR Imaging Using a Two-Dimensional Sparse Antenna Array," in IEEE Geoscience and Remote Sensing Letters, vol. 5, No. 3, pp. 378-382, Jul. 2008.*

(Continued)

*Primary Examiner* — Marcus Windrich
(74) *Attorney, Agent, or Firm* — Lewis Roca Rothgerber Christie LLP

(57) ABSTRACT

A system and method for high-availability inverse synthetic aperture radar (ISAR). In one embodiment a set of quadratic phase vectors, each corresponding to a different acceleration, is multiplied, one at a time, in a Hadamard product, with a 3-dimensional data cube, and a fast Fourier transform (FFT) is taken of the result, to form a 2-dimensional array. The two-dimensional array is made sparse by setting to zero elements that fall below a threshold based on a coherency metric, and the sparse arrays are stacked to form a sparse 3-dimensional image. Projections of the sparse 3-dimensional image are formed for presentation to an operator or an image exploitation system.

19 Claims, 4 Drawing Sheets

(56) References Cited

OTHER PUBLICATIONS

C. Ma, T. S. Yeo, C. S. Tan and H. S. Tan, "Sparse Array 3-D ISAR Imaging Based on Maximum Likelihood Estimation and Clean Technique," in IEEE Transactions on Image Processing, vol. 19, No. 8, pp. 2127-2142, Aug. 2010.*

Ma, et al., "Sparse Array 3-D ISAR Imaging Based on Maximum Likelihood Estimation and Clean Technique", IEEE Transactions on Image Processing, IEEE Service Center, Piscataway, NJ, vol. 19, No, 8, Aug. 1, 2010 (pp. 2127-2142).

Yu, et al., "Motion Compensation Algorithm Based on the Designing Structured Gram Matrices Method", IET Radar, Sonar and Navigation, The Institution of Engineering and Technology, UK, vol. 8, No. 3, Mar. 1, 2014 (pp. 209-219).

Zhong, et al., "ISAR Sparse Aperture Imaging Algorithm for Large Size Target", Journal of Radars, vol. 1, No. 3, Sep. 2012 (pp. 292-300).

Wu, et al., "Two Dimensional Joint Super-Resolution ISAR Imaging Algorithm Based on Compressive Sensing", Journal of Electronics & Information Technology, vol. 36, No. 1, Jan. 1, 2014 (pp. 187-193).

Peng, et al., "A Novel ISAR Imaging Time Selection Method for Maneuvering Target Based on Phase Linear Degree", Journal of Electronics & Information Technology, vol. 32, No. 12, Dec. 2010 (pp. 2795-2801).

Zhang, et al., "3D Motion and Geometric Information System of Single-Antenna Radar Based on Incomplete 1D Range Data", Chinese Journal of Systems Engineering and Electronics, Second Academy Ministry of Aero-Space Industry, Beijing, CN, vol. 22, No. 3, Jun. 1, 2011 (pp. 412-420).

Written Opinion of the International Searching Authority for International Application No. PCT/US2015/012298, filed Jan. 21, 2015, Written Opinion of the International Searching Authority mailed Apr. 21, 2015 (9 pgs.).

International Search Report for International Application No. PCT/US2015/012298, filed Jan. 21, 2015, International Search Report dated Apr. 13, 2015 and mailed Apr. 21, 2015 (4 pgs.).

Berizzi et al., "High-Resolution ISAR Imaging of Maneuvering Targets by Means of the Range Instantaneous Doppler Technique: Modeling and Performance Analysis," IEEE Transactions on Image Processing, 10(12):1880-1890, Dec. 2001.

Burns et al., A SAR image-formation algorithm that compensates for the spatially-variant effects of antenna motion,: SPIE, vol. 2230, pp. 14-24.

Mayhan et al., "High Resolution 3D "Snapshot" ISAR Imaging and Feature Extraction," IEEE Transactions on Aerospace and Electronic Systems, 37(2):630-641, Apr. 2001.

* cited by examiner

HIGH-AVAILABILITY ISAR IMAGE FORMATION

BACKGROUND

1. Field

One or more aspects of embodiments according to the present invention relate to inverse synthetic aperture radar (ISAR) and more particularly to a system and method for obtaining profile presentation images of a vessel imaged using an ISAR system.

2. Description of Related Art

Inverse synthetic aperture radar (ISAR) is a technique used to obtain high resolution radar images of a moving target, and in particular of a periodically rotating target. The resolution may be superior to the diffraction-limited resolution of the physical aperture used because, in an ISAR system, a synthetic aperture may be formed, by combining radar returns received from the target at various target angles, that is significantly larger than the physical aperture.

An ISAR system may use the Doppler shift of the return signals received from points on a target to infer the range velocity of the points, from which, assuming that the target is rotating as a rigid body, the relative distance of points from the axis of rotation, in a direction perpendicular to the radar beam may be inferred. Using this method, ISAR may be used to distinguish different types of vessels at sea. A military vessel, for example, may have structures on its deck that differ from those ordinarily found on a commercial vessel. These structures will be most easily discerned by a conventional ISAR system when the ISAR image is a profile presentation. In this presentation, if the vessel is rolling or pitching, a point high above the deck, e.g., on a mast, and far from the instantaneous axis of rotation, may produce a return with a greater Doppler shift than a point near the axis of rotation, e.g., the roll axis of the vessel. The rotational motion of the vessel may be approximately periodic and sinusoidal, e.g., as the pitches alternately fore and aft, and as a result there may be points in time at which the pitch or roll rate is small, when the periodic rotation rate changes direction. At these points in time a conventional ISAR may be poorly able to distinguish, e.g., a point high above the deck from a point near the axis of rotation because the range rate of both points will be nearly the same.

The spectrum of waves and swells in an ocean results in nearly periodic rolling and pitching motion for vessels, with a period of as long as approximately 10 seconds; some yaw motion may be present also. Generally, pitch or roll motion tends to produce the desirable profile target presentation; yaw produces the less desirable—but still useful—plan view (i.e., top view) of the target. A conventional ISAR system may present to an operator a series of frames corresponding to consecutive ISAR images taken of the target. The operator may inspect each image, discard those that are not helpful for identifying the target, e.g. ones corresponding to images with little instantaneous rotational motion, and save those that are helpful, i.e., those that are nearly profile presentations. A conventional ISAR system may therefore allocate 10 seconds to each contact, to provide a high likelihood that the operator will be presented with at least one image from which a reliable identification can be made. This allocation is impractical for automated systems that require rapid target identification, such as automatic target recognition (ATR) systems, which may, for example, be employed in weapons targeting systems. Thus, there is a need for an ISAR system capable of more rapid target recognition.

SUMMARY

In one embodiment of a system and method for high-availability inverse synthetic aperture radar (ISAR), a set of quadratic phase vectors, each corresponding to a different acceleration, is multiplied, one at a time, in a Hadamard product, with vectors in a 3-dimensional data cube, and a fast Fourier transform (FFT) is taken of the result, to form a 2-dimensional array. The two-dimensional array is made sparse by setting to zero elements that fall below a threshold based on a coherency metric, and the sparse arrays are stacked to form a sparse 3-dimensional image. Projections of the sparse 3-dimensional image are formed for presentation to an operator or an image exploitation system.

According to an embodiment of the present invention there is provided a method for generating a high-availability inverse synthetic aperture radar (ISAR) image, the method comprising: forming a range resolved data cube over sub-apertures, fine range bins, and coarse Doppler bins, the range resolved data cube comprising a plurality of first data vectors in the subaperture direction; forming a plurality of product vectors from: the first data vectors; and a plurality of quadratic phase vectors; performing a fast Fourier transform (FFT) of each of the plurality of product vectors to form a plurality of two-dimensional arrays; forming a plurality of sparse two-dimensional arrays by calculating a coherency metric for each element of each of the plurality of two-dimensional arrays; and stacking the plurality of sparse two-dimensional arrays to form a sparse 3-dimensional (3-D) image.

In one embodiment, the forming of a plurality of product vectors from the plurality of first data vectors and a plurality of quadratic phase vectors comprises forming, for each of the plurality of quadratic phase vectors, a plurality of Hadamard products of: the plurality of first data vectors; and the quadratic phase vector.

In one embodiment, the $j^{th}$ quadratic phase vector, of the plurality of quadratic phase vectors, comprises values calculated according to the equation:

$$\text{quadratic\_phase}(j) = -qpes[j] \cdot \frac{2}{T_{ISAR}^2} \cdot t_{sub}^2,$$

wherein: $t_{sub}^2$ is an element-by-element square of a vector $t_{sub}$ with elements given by $$t_{sub} = \frac{prfHz}{\delta} \cdot \left( q - \text{ceil}\left(\frac{N_{sub}+1}{2}\right) \right),$$

with the value of the index q ranging from 1 to $N_{sub}$, qpes[j] is a $j^{th}$ quadratic phase error, from a set of quadratic phase errors with a stride of π radians ranging from −qpe to qpe, with qpe=

$$\frac{4\pi}{\lambda} \frac{A_{LOS}}{2} \left(\frac{T_{ISAR}}{2}\right)^2,$$

$A_{LOSmax}$ is an estimated worst-case line-of-sight acceleration in the scene, λ is a radar carrier wavelength, $T_{ISAR}$ is an aperture time for ISAR image formation, $N_{sub}$ is a number of subapertures in the range resolved data cube, prfHz is a radar pulse repetition frequency, and $\delta$ is a number of pulses between the start of a subaperture and the start of a subsequent subaperture in the range resolved data cube.

In one embodiment the estimated worst-case line-of-sight acceleration is formed by a spatially-varying autofocus (SVAF) block.

In one embodiment the forming of a plurality of sparse two-dimensional arrays by calculating a coherency metric for each element of each of the plurality of two-dimensional arrays comprises setting to zero array elements the absolute value of the coherency metric of which is less than a threshold value.

In one embodiment, the threshold value is 0.1.

In one embodiment, the method includes forming a projection of the sparse 3-D image to form a viewable image.

In one embodiment, the forming of a projection of the sparse 3-D image to form a viewable image includes forming a projection onto a coordinate plane.

In one embodiment, the forming of a projection of the sparse 3-D image to form a viewable image includes forming a projection onto a plane determined by principal component analysis (PCA) of the sparse 3-D image.

According to an embodiment of the present invention there is provided a system for generating a high-availability inverse synthetic aperture radar (ISAR) image, the system including a processing unit configured to: form a range resolved data cube over subapertures, fine range bins, and coarse Doppler bins, the range resolved data cube comprising a plurality of first data vectors in the subaperture direction; form a plurality of product vectors from: the first data vectors; and a plurality of quadratic phase vectors; perform a fast Fourier transform (FFT) of each of the plurality of product vectors to form a plurality of two-dimensional arrays; form a plurality of sparse two-dimensional arrays by calculating a coherency metric for each element of each of the plurality of two-dimensional arrays; and stack the plurality of sparse two-dimensional arrays to form a sparse 3-dimensional (3-D) image.

In one embodiment, the forming of a plurality of product vectors from the plurality of first data vectors and a plurality of quadratic phase vectors comprises forming, for each of the plurality of quadratic phase vectors, a plurality of Hadamard products of: the plurality of first data vectors; and the quadratic phase vector.

In one embodiment, the $j^{th}$ quadratic phase vector, of the plurality of quadratic phase vectors, comprises values calculated according to the equation:

$$\text{quadratic\_phase}(j) = -qpes[j] \cdot \frac{2}{T_{ISAR}^2} \cdot t_{sub}^2,$$

wherein: $t_{sub}^2$ is an element-by-element square of a vector $t_{sub}$ with elements given by $$t_{sub} = \frac{prfHz}{\delta} \cdot \left(q - \text{ceil}\left(\frac{N_{sub}+1}{2}\right)\right),$$

with the value of the index q ranging from 1 to $N_{sub}$, qpes[j] is a $j^{th}$ quadratic phase error, from a set of quadratic phase errors with a stride of $\pi$ radians ranging from $-qpe$ to $qpe$, with qpe=

$$\frac{4\pi}{\lambda} \frac{A_{LOS}}{2} \left(\frac{T_{ISAR}}{2}\right)^2,$$

$A_{LOSmax}$ is an estimated worst-case line-of-sight acceleration in the scene, $\lambda$ is a radar carrier wavelength, $T_{ISAR}$ is an aperture time for ISAR image formation, $N_{sub}$ is a number of subapertures in the range resolved data cube, prfHz is a radar pulse repetition frequency, and $\delta$ is a number of pulses between the start of a subaperture and the start of a subsequent subaperture in the range resolved data cube.

In one embodiment the estimated worst-case line-of-sight acceleration is formed by a spatially-varying autofocus (SVAF) block.

In one embodiment the forming of a plurality of sparse two-dimensional arrays by calculating a coherency metric for each element of each of the plurality of two-dimensional arrays comprises setting to zero array elements the absolute value of the coherency metric of which is less than a threshold value.

In one embodiment, the threshold value is 0.1.

In one embodiment, the method includes forming a projection of the sparse 3-D image to form a viewable image.

In one embodiment, the forming of a projection of the sparse 3-D image to form a viewable image includes forming a projection onto a coordinate plane.

In one embodiment, the forming of a projection of the sparse 3-D image to form a viewable image includes forming a projection onto a plane determined by principal component analysis (PCA) of the sparse 3-D image.

According to an embodiment of the present invention there is provided a method of resolving an intermediate data product into acceleration bins, the method including: forming a plurality of quadratic phase vectors, each of the plurality of quadratic phase vectors corresponding to an acceleration value; forming a plurality of images from the intermediate data product and the plurality of quadratic phase vectors, by calculating a Hadamard product of the intermediate data product with each of the quadratic phase vectors; and applying a coherency metric to each of the plurality of images, to form a plurality of sparse images.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for high-availability ISAR image formation provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
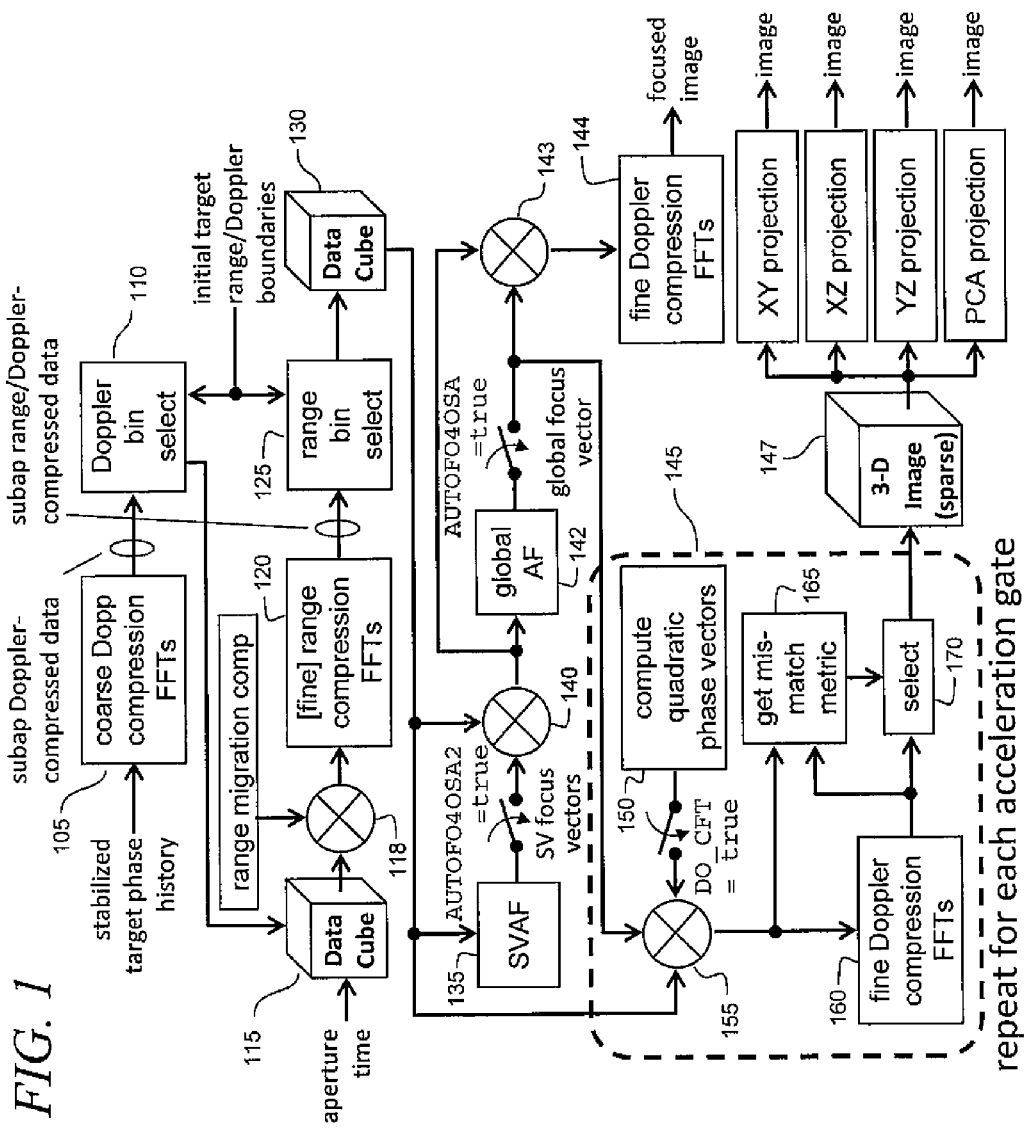
FIG. 1 is a block diagram of a system and method for ISAR image formation according to an embodiment of the present invention.

In one embodiment, an overlapped subaperture (OSA) ISAR algorithm provides a high probability of a single arbitrary ISAR frame having a profile presentation suitable for target classification. This technique is referred to as high-availability OSA ISAR. Referring to FIG. 1, in one embodiment a stabilized target phase history is processed by a number of processing blocks to form five viewable images, which may also be referred to as projections.

In ISAR processing, frames of ISAR imagery may be formed repeatedly. As used herein, the "aperture time" is the length of time in which radar pulses are collected for the generation of a single frame of ISAR imagery. The elapsed time between the start of two consecutive ISAR frames may however be substantially less than the aperture time, if the aperture times for successive frames are highly overlapped. In this case frame-to-frame imagery will not be independent, and a movie formed from consecutive ISAR images will exhibit a slowly varying target image. The overlapped subaperture algorithm (OSA) subdivides the aperture time for a single frame of ISAR imagery into overlapping subintervals of time. The radar data records corresponding to these subintervals are referred to herein as "subapertures".

As used herein, a "range bin" is the output of a filter that has been contrived to match the radar waveform that has been delayed by the round-trip propagation time for a designated radial distance (i.e. range). OSA utilizes an FFT to generate a bank of range bins corresponding to successively greater ranges. As used herein, a "fine range bin" is a range bin from a set of range bins formed with the resolution of the final ISAR imagery. Range bin resolution is distinct from range bin separation. Range resolution is the ability to distinguish reflected waveforms from different ranges and is proportional to the reciprocal of the waveform bandwidth, e.g., more bandwidth yields finer resolution.

As used herein, a "Doppler bin" is the output of a filter that has been contrived to match the Doppler shift of the radar waveform carrier frequency. Doppler frequency shift is proportional to the radial speed between the radar and some reflecting object. If a rotating rigid body—such as a ship—is comprised of multiple reflecting objects, then Doppler shift tends to be proportional to the object's cross-range displacement from the center of the body. Doppler bin resolution is the ability to distinguish between signals of differing frequencies and is proportional to the reciprocal of the length (in seconds) of the record being processed by the filter, i.e., longer record length yields finer resolution.

An OSA may utilize combinations of FFTs to generate banks of Doppler bins corresponding to successively greater radial speeds. As used herein, a "coarse Doppler bin" is a Doppler bin that has resolution proportional to the reciprocal of the subaperture time, and a "fine Doppler bin" has resolution proportional to the reciprocal of the total aperture time for the frame.

OSA combines the corresponding coarse Doppler bin from multiple subapertures to yield the fine Doppler bins for the final ISAR imagery. Each coarse Doppler bin is literally resolved into fine Doppler bins.

Autofocus is a technique to mitigate the deleterious effect on Doppler bin resolution of unknown radial motion between the radar and the target. Autofocus estimates unknown relative motion from the radar data. It is not dependent on measurements from an external sensor; hence, the radar focuses itself. The unknown radial motion must be common to all parts of the target in order for conventional autofocus to operate correctly. Such common-mode errors may be due to the radar having inaccurate knowledge of its own translational motion. Spatially-variant autofocus (SVAF) is a technique to mitigate the deleterious effect on Doppler bin resolution of unknown radial motion between the radar and the target that may vary over the extent of the target. A target with unknown rotation will exhibit spatially-variant unknown radial motion over the extent of the target.

Continuing with FIG. 1, in one embodiment the stabilized target phase history is first processed by a coarse Doppler compression fast Fourier transform block 105, to form subaperture Doppler compressed data. The subaperture Doppler compressed data are then processed by a Doppler bin select block 110 to form a fast time data cube 115, to which range migration compensation is applied, in a first multiplier 118, before fine range compression FFTs are taken in a fine range compression FFT block 120, to form subaperture range/Doppler compressed data. Range bin selection is performed in a range bin select block 125, and a range resolved data cube 130 is formed as a result. The range resolved data cube 130 is a stack of range/Doppler maps (RDMs) that are resolved into fine-range/coarse-Doppler bins. The range resolved data cube 130 contains, in each element, a radar return value corresponding to a subaperture (generalized slow time), coarse Doppler bin, and fine range bin, which form the three axes of the range resolved data cube 130. The range resolved data cube 130 may be processed as, or considered to be, a two-dimensional array of vectors referred to herein as "data vectors". Each data vector contains values from the range resolved data cube 130 for a single coarse Doppler bin and a single fine range bin, and the elements of each data vector are radar return values, in the range resolved data cube 130, for the set of subapertures in the range resolved data cube 130. Both the Doppler bin select block 110 and the range bin select block 125 use initial target range and Doppler boundaries as input. As used herein, generalized slow time refers to a time scale that is of the order of the pulse repetition frequency (PRF) of the radar. The generalized slow time may be the slow time, i.e., time that increments with the PRF, or it may, for example, increment with a subaperture number, as in the overlapped subaperture algorithm (OSA) approach described here, in which the generalized slow time is decimated slow time.

The range resolved data cube 130 is fed as input to several blocks in the high-availability OSA ISAR system: it is processed by a spatially variant autofocus (SVAF) block 135, and a second multiplier 140, which forms products of the output of the spatially variant autofocus block 135 and the range resolved data cube 130. The output of the second multiplier 140 is processed by a global autofocus block 142 to form a global focus vector, which is multiplied in a third multiplier 143 by the output of the second multiplier 140, and then processed by a first fine Doppler compression FFT block 144 to form a focused image. The range resolved data cube 130 is also fed into an acceleration processing block 145, the output of which is a sparse 3-D image 147.

The acceleration processing block 145 contains several processing blocks. A quadratic phase vector generator block 150 generates a set of quadratic phase vectors, each quadratic phase vector having a phase value for each subaperture, i.e., for each value of generalized slow time. The phase values in each quadratic phase vector vary quadratically with generalized slow time, with a quadratic coefficient proportional to an acceleration. Radar returns for an accelerating point on a target have a changing Doppler frequency, which may also be referred to as Doppler migration, chirp, or quadratic phase.

In the case of a vessel at sea, for example, at points in time at which the pitch or roll rate is small, when the periodic rotation rate changes direction, there may nonetheless be significant rotational acceleration, i.e., a significant rate of change of the rotation rate. This rotational acceleration may be manifested in the radar returns from a point on the vessel, at some distance from the instantaneous axis of rotation, as a changing Doppler frequency, i.e., a chirp or quadratic phase.

In one embodiment, Doppler migration correction is performed in the acceleration processing block 145 by taking a Hadamard (pointwise) product of the quadratic phase vector with each of the data vectors in the range resolved data cube 130. The results of these Hadamard products are referred to herein as product vectors. The Hadamard product is performed by a fourth multiplier 155. The fourth multiplier 155 may also apply, by the use of a Hadamard product, the global focus vector, in the subaperture direction of the range resolved data cube 130. As indicated by the switch shown at the output of the global autofocus block 142, the global autofocus may be selectively enabled or disabled.

The result of each Hadamard product is a product vector incorporating the Doppler migration correction. The set of product vectors is then, in a second fine Doppler compression FFT block 160, resolved into a two-dimensional array, which is a range-Doppler map having axes corresponding to fine range, and fine Doppler frequency. In the second fine Doppler compression FFT block 160, the subapertures are combined to subdivide the coarse Doppler bins of the range resolved data cube 130 into the fine Doppler bins of the two-dimensional array. This combination of taking Hadamard products with quadratic phase vectors and performing a fine Doppler compression FFT may be referred to as a chirp Fourier transform (CFT).

To form the quadratic phase vectors, an estimate of the worst-case line-of-sight acceleration $A_{LOS}$ is obtained from the spatially variant autofocus (SVAF) block 135, and a worst case quadratic phase error qpe is calculated, using:

$$qpe = \frac{4\pi}{\lambda} \cdot \frac{A_{LOS}}{2} \left(\frac{T_{ISAR}}{2}\right)^2$$

where $T_{ISAR}$ is the aperture time, A is the carrier wavelength, and $A_{LOS}$ is the estimated line-of-sight acceleration.

A set of quadratic phase errors with a stride of $\pi$ radians ranging from $-qpe$ to $qpe$ is then formed:

$$qpes = \left[-\frac{\pi}{\lambda} \cdot \frac{A_{LOSmax}}{2} \cdot T_{ISAR}^2 : \pi : \frac{\pi}{\lambda} \cdot \frac{A_{LOSmax}}{2} \cdot T_{ISAR}^2\right], N_{qpe} = \text{length}(qpes)$$

and the $j^{th}$ quadratic phase vector, of the set of quadratic phase vectors, is formed using:

$$\text{quadratic\_phase}(j) = -qpes[j] \cdot \frac{2}{T_{ISAR}^2} \cdot t_{sub}^2,$$

where $t_{sub}$ is a vector of subaperture times given by $$t_{sub} = \frac{prfHz}{\delta} \cdot \left(q - \text{ceil}\left(\frac{N_{sub}+1}{2}\right)\right),$$

with the value of the index q ranging from 1 to $N_{sub}$, and $t_{sub}^2$ is the vector formed by squaring each element of $t_{sub}$. In these expressions: $A_{LOSmax}$ is the estimated worst-case line-of-sight acceleration in the scene, $\lambda$ Is the radar carrier wavelength, $T_{ISAR}$ is the aperture time for ISAR image formation, $N_{sub}$ is the number of subapertures in the range resolved data cube 130, $N_{qpe}$ is the number of quadratic phase vectors, prfHz is the radar pulse repetition frequency, $\delta$ is the number of pulses between the start of a subaperture and the start of a subsequent subaperture in the range resolved data cube 130, and ceil(x) is defined to be the smallest integer larger than x. The stride of $\pi$ radians insures that a feature straddling CFT bins may still pass the coherency threshold.

The two-dimensional array is made sparse by calculating a coherency metric for each element, and setting to zero each element having a coherency metric value less than a threshold. The coherency metric, which may also be referred to as a mismatch metric, is evaluated in a mismatch metric block 165, according to the following equations, which use the notation of MATLAB™ pseudocode:

$$[fRngKeep, cDoppKeep, N_{sub}] = \text{size}(datacube2)$$

$$fDoppKeep = cDoppKeep \cdot \text{fDopp\_per\_cDopp}$$

$$fDindices = [1 : \text{fDopp\_per\_cDopp}] + ofst$$

$$const = \frac{N_{sub} \cdot \sum_{n=1}^{N_{sub}} win_{fDopp}[n]^2}{\left(\sum_{n=1}^{N_{sub}} win_{fDopp}[n]\right)^2}$$

$$\forall j \in [1 : N_{qpe}]$$

$$\forall k \in [1 : fRngKeep], m \in [1 : cDoppKeep]$$

$$cohdem[k, m] = N_{sub} \cdot \sum_{n=1}^{N_{sub}} |datacube2[k, m, n] \cdot win_{fDopp}[n]|^2$$

$$tempxfm[k, m, :] = fft(datacube2[k, m, :] \cdot {}^*win_{fDopp} \cdot$$

$${}^*\exp(i \cdot focus) \cdot {}^*\exp(i \cdot \text{quadratic\_phase}(j)), N_{DFFT})$$

$$tempxfm = |tempxfm[:, :, fDindices]|$$

$$tempxfm = |tempxfm[:, :, fDindices]|$$

$$cohmetric = const \cdot \frac{tempxfm^2}{repmat(cohdem, [1 \ 1 \ \text{fDopp\_per\_cDopp}])}$$

where datacube2 is the range resolved data cube 130, fRngKeep is the number of fine range bins retained for the range resolved data cube 130, cDoppKeep is the number of coarse Doppler bins retained for the range resolved data cube 130, $N_{sub}$ is the number of subapertures in the range resolved data cube 130, fDoppper_cDopp is the number of fine Doppler subdivisions corresponding to each coarse Doppler bin, $win_{fDopp}$ is the data taper "window" for the fine Doppler FFT, focus is the [optional] global autofocus vector, NDFFT is the length of the fine Doppler FFT, and cohmetric is the coherency metric.

The array tempxfm is represented in the equation above as a 3-dimensional array, but fundamentally it is a 2-dimensional quantity, because the first index corresponds to range, and the second and third indices correspond to coarse and fine Doppler, which are the same variable on two different scales. This array, therefore, may without loss of generality be reshaped and represented as a 2-dimensional array with indices corresponding to range and fine Doppler. This reshaping is done in the equations above when rdtemp is formed, by a reshape command. In the same step, rdtemp is made sparse, in the sense that many or most of its elements are zero. In particular, bins for which the mismatch between the acceleration used to generate the quadratic phase vector and the acceleration of a point on the target is excessive are set to zero. A sparse array may be efficiently stored in computer memory using a sparse representation of the sparse array, i.e., a representation in computer memory that does not explicitly store the zero elements but instead stores the non-zero elements only, with an indication of the location in the array of each non-zero element. This conversion to a sparse representation in memory is accomplished, in the equations above, by the sparse( ) operation. The utility of the coherency metric is that bright spurious features in the 2-D array tend to be suppressed while faint legitimate features tend to be preserved.

The sparse 2D array is then formed, and stacked into a 3D image array, according to the following equations:

$$rdtemp = reshape\left(permute\left(\begin{matrix} tempxfm \cdot {}^*(cohmetric \geq cohthresh), \\ [1 \ 3 \ 2] \end{matrix}\right), \\ [fRngKeep \ fDoppKeep]\right)$$

$$imagearray3D\{j\} = \text{sparse}(rdtemp)$$

where cohthresh is the threshold on the coherency metric, and imagearray3D is the 3-D sparse image array. In one embodiment the threshold is set to 0.1. A selection block 170 selects elements of the two-dimensional array and preserves them while setting the remaining elements to zero, to form the sparse two-dimensional array.

This process is repeated for a range of acceleration values, each acceleration value being used to generate a quadratic phase vector and resulting in a sparse two-dimensional array. The sparse two-dimensional arrays are stacked to form a sparse three-dimensional (3-D) image 147. Four two-dimensional images, suitable for displaying to an operator using a two-dimensional display device such as a video monitor, are then formed from the sparse 3-D image 147. Three such two-dimensional images are formed by projecting the sparse 3-D image 147 onto one of the three respective coordinate planes, i.e., by performing an XY projection, an XZ projection, or a YZ projection. A fourth is formed by performing a principal component analysis (PCA) to determine the best planar fit to the 3-D cluster of points in the sparse 3-D image 147. The PCA results in a plane which is in general oblique to the coordinate planes, and a projection onto which may be a good approximation to a profile presentation of the target. A viewable image may be formed either by projecting the sparse 3-D image 147 onto the plane found by PCA, or, equivalently, by rotating the sparse 3-D image 147 with a rotation which, if applied to the plane found by PCA, would rotate its normal parallel to the Z-axis, and then projecting the rotated sparse 3-D image onto the X-Y plane.

Figure 2:
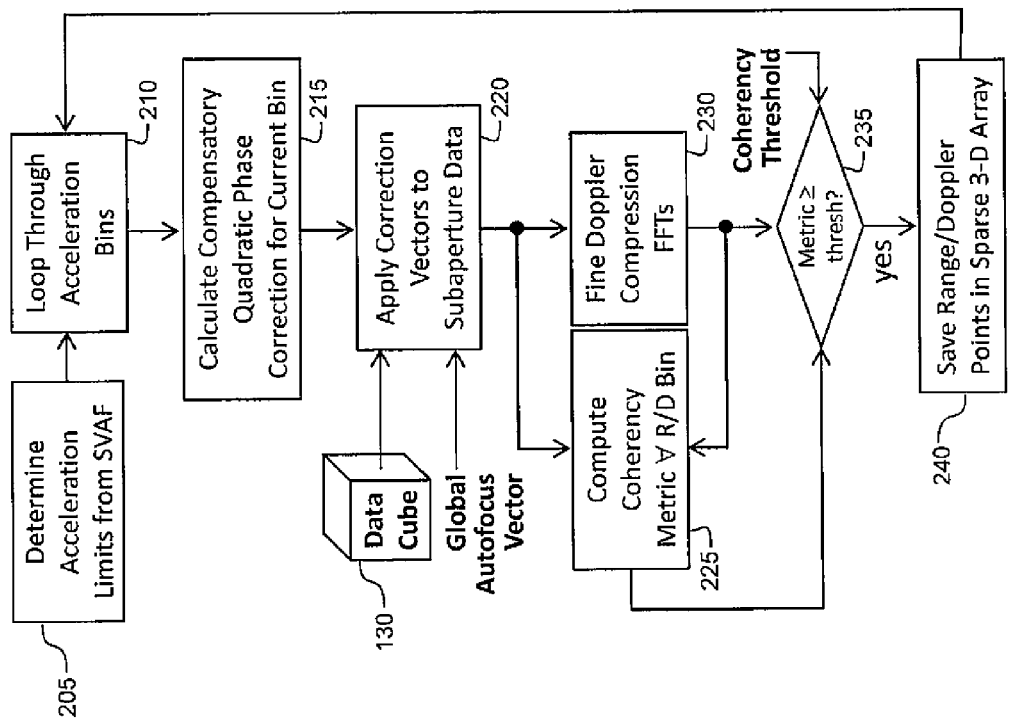
FIG. 2 is a flow chart illustrating a method for forming a sparse 3-dimensional image according to an embodiment of the present invention.

Referring to FIG. 2, in one embodiment a method for high-availability ISAR image formation includes determining, in a step 205, acceleration limits from a spatially variant autofocus algorithm, looping, in a step 210, through acceleration bins, i.e., iterating over a set of acceleration values covering the range with a step size selected to result in quadratic phase vectors with a stride of $\pi$ radians, and calculating, in a step 215, quadratic phase vectors. The method further includes applying, in a step 220, two correction vectors, a quadratic phase correction and a global autofocus, to the range resolved data cube 130, by forming Hadamard products of the quadratic phase vector and the global autofocus vector with data vectors in the range resolved data cube 130. The method further includes computing, in a step 225, a coherency metric and threshold, applying, in a step 230, a set of fine Doppler compression FFTs to form a two-dimensional array, comparing, in a step 235, each element of the two-dimensional array to the coherency threshold, and storing, in a step 240, the value in a sparse 3-D image if it exceeds the coherency threshold.

Figure 3:
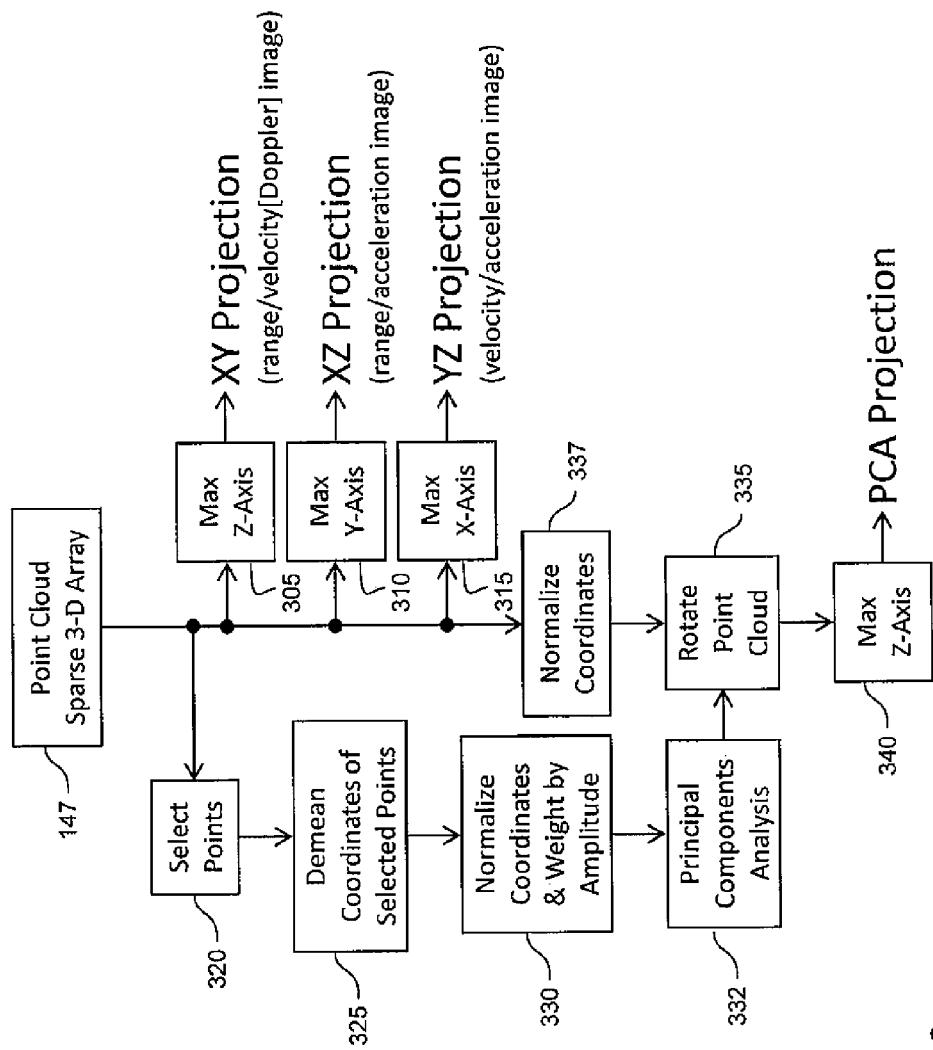
FIG. 3 is a flow chart illustrating a method for forming a plurality of viewable images from a sparse 3-dimensional image according to an embodiment of the present invention.

Referring to FIG. 3, in one embodiment the sparse 3-D image 147 generated by the method illustrated in FIG. 2 may be used to form a several projections. Three projections may be formed from the sparse 3-D image 147 by, in a step 305, projecting the image onto the XY plane, or, in a step 310, projecting the image onto the XZ plane, or, in a step 315, projecting the image onto the YZ plane. A fourth projection may be formed as follows. In a step 320, high-amplitude points, e.g., points with amplitudes exceeding 0.25 of the mean amplitude of the non-zero points in the sparse 3-D image 147, are selected from the sparse 3-D image 147. The coordinates of these selected points are, in a step 325, demeaned, the coordinates are, in a step 330, normalized, i.e., disparate units of the three axes are resealed to common contrived units that promote profile target presentation, and the Euclidean distance from origin in resealed coordinates is weighted by each point's normalized amplitude. In a step 332, principal component analysis is used to identify the best planar fit to the selected points. A rotation is then applied, in step 335, to the sparse 3-D image 147, after the coordinates in the latter have been normalized, in a step 337. The rotation applied in step 335 is selected so that if it were applied to the best planar fit to the points, it would align the normal to the best planar fit with the Z-axis. Once rotated, the rotated sparse 3-D image is projected onto the XY plane, in a step 340, to form the PCA projection. Equivalently, the un-rotated sparse 3-D image may instead be projected onto the plane determined by principal component analysis (PCA).

The selection block 320 is used in part to preserve the effectiveness of the PCA projection. The CFT does not necessarily suppress low amplitude responses, such as aliased patterns that are inherent in the OSA algorithm. In particular, the CFT sidebands roll off slowly, and the coherency test improves the selectivity of the CFT filter bank. Low amplitude outliers will skew conventional PCA. The selection block 320 mitigates this skewing by removing low amplitude responses that fall below the threshold.

Figure 4:
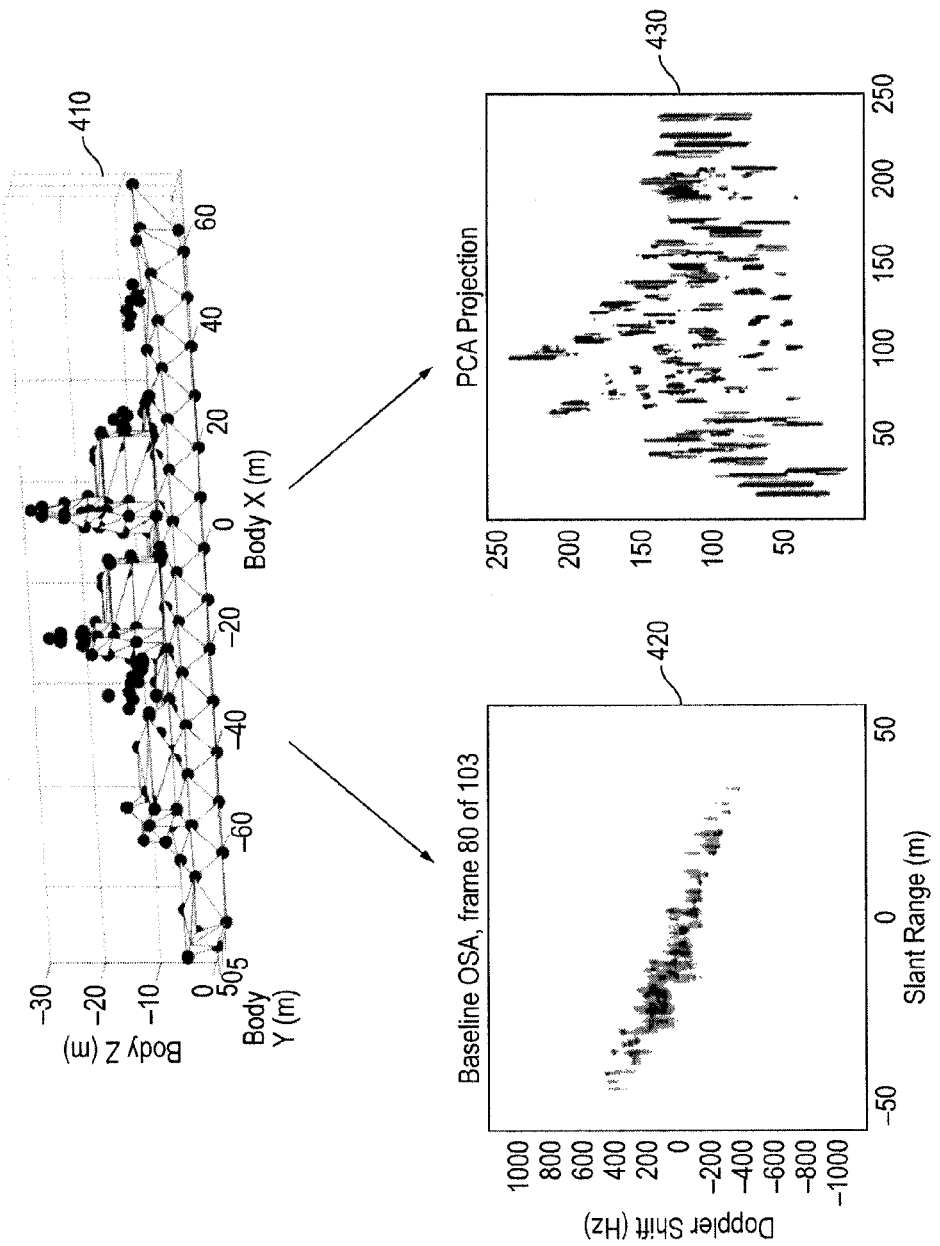
FIG. 4 is a perspective view of a simulated target, and two illustrations of simulated viewable images produced according to an embodiment of the present invention.

Referring to FIG. 4, in one embodiment an example of a vessel structure 410, generates, in a simulation of OSA ISAR processing, a first image 420 at the output of the first fine Doppler compression FFT block 144 and a second image 430 as a PCA projection. In this example the first image is not nearly a profile target presentation. Points corresponding to the superstructure of the vessel, which otherwise would be helpful for identifying the type of vessel, fall nearly on top of one another, and the resulting image provides little useful information about the shape of the vessel. By comparison, the PCA projection 430 provides a good representation of the relative heights of elements of the superstructure, and of their relative locations on the deck of the vessel.

ISAR systems constructed according to embodiments of the present invention may be used in automatic target recognition systems, and also in non-weapon applications such as surveillance radar. In such a radar system there may be hundreds of contacts, and the system may point the radar antenna at one target at a time after performing an initial sweep to collect data on the locations of targets. The system may then use ISAR to identify each target and label each target in a presentation provided to an operator, e.g., using a video display. In such an application it may be advantageous to perform target identification rapidly, i.e., to use a high-availability ISAR system, in part because other targets may move while one target is being identified, and the risk of breaking a target track, i.e., being unable to associate a sequence of contacts with a single object, increases as the time interval during which the antenna is stopped increases.

Embodiments of the present invention may also be used more generally in a class of techniques referred to as wave number techniques. In a wave number technique, the raw data provided to the processing system is the Fourier transform of the scene. Examples of wave number techniques include range migration, and polar formatting algorithms, as well as the OSA ISAR technique described above. In wave number techniques an intermediate data product is formed when generalized slow time samples are resolved into cross range bins, or, equivalently, Doppler bins. In a polar formatting algorithm generalized slow time is formed by resampling slow time; in particular, in a polar formatting algorithm, a complex interpolation is applied to the slow time samples to generate generalized slow time. In a wavenumber technique, a quadratic phase vector may be applied to this intermediate data product, using a Hadamard product, and an FFT may then be taken along the generalized slow time direction. As in the embodiments described above, the application of a set of quadratic phase vectors with quadratic coefficients corresponding to different accelerations may be used in a wave number technique to resolve the acceleration of the target.

Elements of embodiments of the present invention may be implemented using one or more processing units. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). The term "processing unit" is used herein to include any combination of hardware, firmware, and software, employed to process data or digital signals. In a processing unit, as used herein, each function is performed either by hardware configured, i.e., hard-wired, to perform that function, or by more general purpose hardware, such as a CPU, configured to execute instructions stored in a non-transitory storage medium.

Although limited embodiments of a system and method for high-availability ISAR image formation have been specifically described and illustrated herein, many modifications and variations will be apparent to those skilled in the art. Accordingly, it is to be understood that the system and method for high-availability ISAR image formation employed according to principles of this invention may be embodied other than as specifically described herein. The invention is also defined in the following claims, and equivalents thereof.

What is claimed is:

1. A method for generating a high-availability inverse synthetic aperture radar (ISAR) image, the method comprising:
    forming, by a processing unit, a range resolved data cube over subapertures, fine range bins, and coarse Doppler bins, the range resolved data cube comprising a plurality of first data vectors in the subaperture direction;
    forming a plurality of product vectors from the first data vectors and a plurality of quadratic phase vectors;
    performing a fast Fourier transform (FFT) of each of the plurality of product vectors to form a plurality of two-dimensional arrays;
    forming a plurality of sparse two-dimensional arrays by calculating a coherency metric for each element of each of the plurality of two-dimensional arrays; and
    stacking the plurality of sparse two-dimensional arrays to form a sparse 3-dimensional (3-D) image.

2. The method of claim 1, wherein the forming of the plurality of product vectors from the plurality of first data vectors and the plurality of quadratic phase vectors comprises forming, for each of the plurality of quadratic phase vectors, a plurality of Hadamard products of:
    the plurality of first data vectors; and
    the quadratic phase vector.

3. The method of claim 1, wherein the $j^{th}$ quadratic phase vector, of the plurality of quadratic phase vectors, comprises values calculated according to the equation:

$$\text{quadratic\_phase}(j) = -qpes[j] \cdot \frac{2}{T_{ISAR}^2} \cdot t_{sub}^2,$$

wherein:
    $t_{sub}^2$ is an element-by-element square of a vector $t_{sub}$ with elements given by $$t_{sub} = \frac{prfHz}{\delta} \cdot \left(q - \text{ceil}\left(\frac{N_{sub}+1}{2}\right)\right),$$

with the value of the index q ranging from 1 to $N_{sub}$,
    qpes[j] is a $j^{th}$ quadratic phase error, from a set of quadratic phase errors, with a stride of π radians, ranging from −qpe to qpe, with $$qpe = \frac{4\pi}{\lambda} \frac{A_{LOS}}{2} \left(\frac{T_{ISAR}}{2}\right)^2,$$

$A_{LOSmax}$ is an estimated worst-case line-of-sight acceleration in the scene,
λ is a radar carrier wavelength,
$T_{ISAR}$ is an aperture time for ISAR image formation,
$N_{sub}$ is a number of subapertures in the range resolved data cube,
prfHz is a radar pulse repetition frequency, and
δ is a number of pulses between the start of a subaperture and the start of a subsequent subaperture in the range resolved data cube.

4. The method of claim 3, wherein the estimated worst-case line-of-sight acceleration is formed by a spatially-varying autofocus (SVAF) block.

5. The method of claim 1, wherein the forming of the plurality of sparse two-dimensional arrays by calculating the coherency metric for each element of each of the plurality of two-dimensional arrays comprises setting to zero array elements the absolute value of the coherency metric of which is less than a threshold value.

6. The method of claim 5, wherein the threshold value is 0.1.

7. The method of claim 1, comprising forming a projection of the sparse 3-D image to form a viewable image.

8. The method of claim 7, wherein the forming of the projection of the sparse 3-D image to form the viewable image comprises forming a projection onto a coordinate plane.

9. The method of claim 7, wherein the forming of the projection of the sparse 3-D image to form a viewable image comprises forming a projection onto a plane determined by principal component analysis (PCA) of the sparse 3-D image.

10. A system for generating a high-availability inverse synthetic aperture radar (ISAR) image, the system comprising a processing unit configured to:
  form a range resolved data cube over subapertures, fine range bins, and coarse Doppler bins, the range resolved data cube comprising a plurality of first data vectors in the subaperture direction;
  form a plurality of product vectors from the first data vectors and a plurality of quadratic phase vectors;
  perform a fast Fourier transform (FFT) of each of the plurality of product vectors to form a plurality of two-dimensional arrays;
  form a plurality of sparse two-dimensional arrays by calculating a coherency metric for each element of each of the plurality of two-dimensional arrays; and
  stack the plurality of sparse two-dimensional arrays to form a sparse 3-dimensional (3-D) image.

11. The system of claim 10, wherein the forming of the plurality of product vectors from the plurality of first data vectors and the plurality of quadratic phase vectors comprises forming, for each of the plurality of quadratic phase vectors, a plurality of Hadamard products of:
  the plurality of first data vectors; and
  the quadratic phase vector.

12. The system of claim 10, wherein the $j^{th}$ quadratic phase vector, of the plurality of quadratic phase vectors, comprises values calculated according to the equation:

$$\text{quadratic\_phase}(j) = -qpes[j] \cdot \frac{2}{T_{ISAR}^2} \cdot t_{sub}^2,$$

wherein:
  $t_{sub}^2$ is an element-by-element square of a vector $t_{sub}$ with elements given by $$t_{sub} = \frac{prfHz}{\delta} \cdot \left(q - \text{ceil}\left(\frac{N_{sub}+1}{2}\right)\right),$$

with the value of the index q ranging from 1 to $N_{sub}$, qpes[j] is a $j^{th}$ quadratic phase error, from a set of quadratic phase errors with a stride of $\pi$ radians ranging from -qpe to qpe, with $$qpe = \frac{4\pi}{\lambda} \frac{A_{LOS}}{2} \left(\frac{T_{ISAR}}{2}\right)^2,$$

$A_{LOSmax}$ is an estimated worst-case line-of-sight acceleration in the scene,
$\lambda$ is a radar carrier wavelength,
$T_{ISAR}$ is an aperture time for ISAR image formation,
$N_{sub}$ is a number of subapertures in the range resolved data cube,
prfHz is a radar pulse repetition frequency, and
$\delta$ is a number of pulses between the start of a subaperture and the start of a subsequent subaperture in the range resolved data cube.

13. The system of claim 12, wherein the estimated worst-case line-of-sight acceleration is formed by a spatially-varying autofocus (SVAF) block.

14. The system of claim 10, wherein the forming of the plurality of sparse two-dimensional arrays by calculating the coherency metric for each element of each of the plurality of two-dimensional arrays comprises setting to zero array elements the absolute value of the coherency metric of which is less than a threshold value.

15. The system of claim 14, wherein the threshold value is 0.1.

16. The system of claim 10, comprising forming a projection of the sparse 3-D image to form a viewable image.

17. The system of claim 16, wherein the forming of the projection of the sparse 3-D image to form the viewable image comprises forming a projection onto a coordinate plane.

18. The system of claim 16, wherein the forming of the projection of the sparse 3-D image to form the viewable image comprises forming a projection onto a plane determined by principal component analysis (PCA) of the sparse 3-D image.

19. A method of resolving an intermediate data product into acceleration bins, the method comprising:
  forming, by a processing unit, a plurality of quadratic phase vectors, each of the plurality of quadratic phase vectors corresponding to an acceleration value;
  forming a plurality of images from the intermediate data product and the plurality of quadratic phase vectors, by calculating a Hadamard product of the intermediate data product with each of the quadratic phase vectors; and
  applying a coherency metric to each of the plurality of images, to form a plurality of sparse images.

* * * * *